(12) United States Patent
Vlaznev et al.

(10) Patent No.: US 11,520,889 B2
(45) Date of Patent: *Dec. 6, 2022

(54) METHOD AND SYSTEM FOR GRANTING ACCESS TO A FILE

(71) Applicant: AO Kaspersky Lab, Moscow (RU)

(72) Inventors: Denis O. Vlaznev, Moscow (RU); Sergey V. Kubrin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 121 days.

This patent is subject to a terminal disclaimer.

(21) Appl. No.: 17/098,512

(22) Filed: Nov. 16, 2020

(65) Prior Publication Data

US 2021/0064752 A1  Mar. 4, 2021

Related U.S. Application Data

(63) Continuation of application No. 16/188,449, filed on Nov. 13, 2018, now Pat. No. 10,867,043.

(30) Foreign Application Priority Data

Jun. 29, 2018  (RU) ................................ 2018123687

(51) Int. Cl.
*G06F 21/56* (2013.01)
(52) U.S. Cl.
CPC .......... *G06F 21/566* (2013.01); *G06F 21/567* (2013.01)
(58) Field of Classification Search
None
See application file for complete search history.

(56) References Cited

U.S. PATENT DOCUMENTS

| 7,694,150 B1* | 4/2010 | Kirby ................. G06F 21/55 713/193 |
| 7,984,304 B1* | 7/2011 | Waldspurger ......... G06F 21/565 717/124 |
| 8,607,066 B1* | 12/2013 | Kailash ............... H04L 63/1441 713/188 |
| 9,202,050 B1* | 12/2015 | Nachenberg .......... G06F 21/564 |
| 10,867,043 B2* | 12/2020 | Vlaznev .............. G06F 21/567 |
| 2011/0138465 A1* | 6/2011 | Franklin ............... G06F 21/564 726/23 |
| 2019/0026466 A1* | 1/2019 | Krasser ................. G06N 20/20 |

* cited by examiner

*Primary Examiner* — Benjamin E Lanier
(74) *Attorney, Agent, or Firm* — ArentFox Schiff LLP; Michael Fainberg

(57) ABSTRACT

Disclosed herein are systems and methods for granting access to a file. In one aspect, an exemplary method comprises, calculating a first hash of a portion of the file, searching for the first hash in a local database, when the first hash is found indicates that the file is malicious, calculating a second hash, searching for the second hash in the verdict cache, and pronouncing a final decision as to a harmfulness of the file, and when either the first hash is not found in the verdict cache or the first hash is found and indicates that the file is trusted, granting access to the file, calculating a second hash of the file, generating a request for information about the file and sending the request to a remote server, and pronouncing a decision as to harmfulness of the file based on results of the search received from the remote server.

20 Claims, 5 Drawing Sheets

METHOD AND SYSTEM FOR GRANTING ACCESS TO A FILE

CROSS REFERENCE TO RELATED APPLICATIONS

The present application is a continuation application of U.S. patent application Ser. No. 16/188,449, filed on Nov. 13, 2018, which claims priority to Russian Patent Application No. 2018123687, filed on Jun. 29, 2018, the entire content of which are incorporated herein by reference.

FIELD OF TECHNOLOGY

The present disclosure relates to the field of computer security, more specifically to systems and methods for granting access to a file.

BACKGROUND

Computer viruses, worms, Trojan horses, rootkits and spyware programs are examples of malicious programs afflicting computer systems around the world. Despite the presence of technical differences between each type of malicious program, in the majority of cases they are called "viruses". The entire group of viruses is aimed at inflicting harm on both the computer itself and on the personal data of users.

One method for counteracting malicious programs is the use of antivirus software (an antivirus). An antivirus is a program package designed to detect and remove malicious programs from a computer, as well as eliminate the consequences of the presence of malicious programs. In order to detect malicious applications, an antivirus program performs a complete or a selective scanning of the files present on the local and network devices for storage of data, such as hard disks.

A typical antivirus includes a mechanism for the scanning of files and a database. The database contains at least antivirus records (patterns) for identifying known malicious programs. Each antivirus record can be represented in the indicated database in the form of a signature (a checksum of a segment of code), a heuristic rule, and so forth. In order to scan a file for the presence of malicious code, the scanning mechanism parses the file and compares its contents with the antivirus records in the database. It is also possible to use a hash value of the files being checked, rather than a direct comparison of antivirus records. The hash value of a file is the result of the transformation of the file by applying a hashing algorithm with the aid of a particular hash function, such as an MD5 or an SHA1.

One of the times for performing an antivirus scan is a scan upon attempted access to a file (OAS, On-Access Scan), for example, upon launching or parsing of the file. When the scan is performed upon the attempted access, the launching of the file is intercepted. Then, the antivirus scan of the file is performed. In the course of performing the antivirus scan of the file, the hash value of the file may be calculated and compared against a hash value stored in the database, wherein the database maybe located either together with the antivirus application (in the same computer system) or remotely—on a remote (network) server. Even though the calculation of the hash value and its comparison is an effective solution, the calculation of the hash value and the subsequent comparison take a significant length of time, during which there is no access to the file. Moreover, the larger the file, the longer it takes to calculate the hash value of the file and also the longer it takes to perform the antivirus scan. Thus, access to the file may be significantly delayed.

Another approach for performing an antivirus scan is to use the techniques of synchronous and asynchronous file scanning. In the synchronous mode, when access to a file is attempted, all actions by other programs on the file being scanned are blocked by the antivirus program until the scan is completed. The blocking of the files also makes it possible to prevent the execution of the malicious code from the file and to isolate the malicious file in good time. In contrast, asynchronous file scan may be advisable when the threat of execution of malicious code upon accessing the file is minimal, and there is no need to block files. In asynchronous mode, no blocking occurs upon accessing the file, but rather the file itself is scanned in parallel with other actions taking place on the file (for example, its execution). However, present-day antivirus scan technologies utilizing techniques of file scanning by different methods specifically describe first and foremost the possibility of scanning files by one method or another, but the question of making a decision as to the selecting of the necessary (optimal) type of the corresponding scan is not addressed.

Yet another defect of antivirus systems is the fact that there is a likelihood of errors occurring in the operation of the antivirus scan. The errors are divided into so-called errors of the first kind (false positives) and errors of the second kind (false negatives). Errors of the first kind occur when an antivirus system detects a malicious object, even though the object in fact presents no threat. Errors of the second kind in the context of antivirus systems involve the situation where a virus or other malicious object is present, but the antivirus system does not detect it. In other words, a false alarm occurs in the system. In order to boost the quality of working of an antivirus system, it becomes necessary to lower the probabilities of occurrences of errors of the first and second kinds.

Hence there is a need to create a solution that reduces the time for performing an antivirus scan (e.g., for calculating the hash value of a file) and also makes an optimal selection of the type of antivirus scan.

SUMMARY

Aspects of the disclosure relate to the field of generating a request for information about the file while performing an antivirus scan.

In one exemplary aspect, a method for granting access to a file is implemented in a computer comprising a hardware processor, the method comprising: calculating a first hash of a portion of the file, searching for the first hash in a local database that contains a verdict cache containing hashes of known malicious files and trusted files, when the first hash is found in the verdict cache and the first hash indicates that the file is malicious, calculating a second hash of the file, searching for the second hash in the verdict cache and/or a remote server, and pronouncing a final decision as to a harmfulness or safety of the file based on the results of the search, and when either the first hash is not found in the verdict cache or the first hash is found in the verdict cache and indicates that the file is a trusted file, granting access to the file, calculating a second hash of the file, generating a request for information about the file including at least an indication as to harmfulness of the file, sending the request to a remote server to search for the second hash in a verdict cache of the remote server, and pronouncing a decision as to harmfulness or safety of the file based on results of the search received from the remote server in response to the request.

According to one aspect of the disclosure, a system is provided for granting access to a file, the system comprising a hardware processor configured to: calculate a first hash of a portion of the file, search for the first hash in a local database that contains a verdict cache containing hashes of known malicious files and trusted files, when the first hash is found in the verdict cache and the first hash indicates that the file is malicious, calculate a second hash of the file, search for the second hash in the verdict cache and/or a remote server, and pronounce a final decision as to a harmfulness or safety of the file based on the results of the search, and when either the first hash is not found in the verdict cache or the first hash is found in the verdict cache and indicates that the file is a trusted file, grant access to the file, calculate a second hash of the file, generate a request for information about the file including at least an indication as to harmfulness of the file, send the request to a remote server to search for the second hash in a verdict cache of the remote server, and pronounce a decision as to harmfulness or safety of the file based on results of the search received from the remote server in response to the request.

In one exemplary aspect, a non-transitory computer-readable medium is provided storing a set of instructions thereon for granting access to a file, wherein the set of instructions comprises instructions for: calculating a first hash of a portion of the file, searching for the first hash in a local database that contains a verdict cache containing hashes of known malicious files and trusted files, when the first hash is found in the verdict cache and the first hash indicates that the file is malicious, calculating a second hash of the file, searching for the second hash in the verdict cache and/or a remote server, and pronouncing a final decision as to a harmfulness or safety of the file based on the results of the search, and when either the first hash is not found in the verdict cache or the first hash is found in the verdict cache and indicates that the file is a trusted file, granting access to the file, calculating a second hash of the file, generating a request for information about the file including at least an indication as to harmfulness of the file, sending the request to a remote server to search for the second hash in a verdict cache of the remote server, and pronouncing a decision as to harmfulness or safety of the file based on results of the search received from the remote server in response to the request.

In one aspect, the second hash is calculated based on all portions of the file.

In one aspect, the portion of the file used for calculating the first hash is selected based on a predetermined criteria, the predetermined criteria being based at least on one of: a type of the file, a size of the file, and metadata of the file.

In one aspect, the method further comprises performing an antivirus scanning of the file based on the second hash with the local database.

In one aspect, the method further comprises, when the second hash is found in the local database, halting execution of the file and synchronously search for the second hash in a database of the remote server.

In one aspect, the method further comprises determining errors of a first kind and second kind in verdicts based on comparisons of first hashes and verdict cache in the local database.

In one aspect, the local database is located on a same computing device performing the granting of access to the file.

In one aspect, the calculating of the first hash of the portion of the file is performed synchronously, the searching for the first hash in the local database that contains the verdict cache is performed synchronously, when the first hash is found in the verdict cache and the first hash indicates that the file is malicious, the calculating of the second hash of the file, and the searching for the second hash in the verdict cache or the remote server are performed synchronously, when either the first hash is not found in the verdict cache or the first hash is found in the verdict cache and indicates that the file is a trusted file, the calculating of the second hash of the file, the generating a request for information about the file including at least an indication as to harmfulness of the file, and the sending the request to a remote server to search for the second hash in a verdict cache of the remote server are performed asynchronously.

The granting of access to a file in accordance with the teachings of the present invention allows a more effective solution that addresses the problem of file scanning. The improvement in effectiveness is achieved: by using a mechanism for generating a "short" hash value of a file, followed by performing a choice of a synchronous or asynchronous operating mode. For example, the reduction in the time delay in launching the file may be achieved by first calculating a short hash value of the file, and then selecting the optimal type of generation of a request for information about the file on the basis of the result of a search for the short hash value, where the selection is done in such a way as to ensure the security of the computer.

Moreover, the method of the present disclosure advantageously decreases the time needed for performing the antivirus scan.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for granting access to a file. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
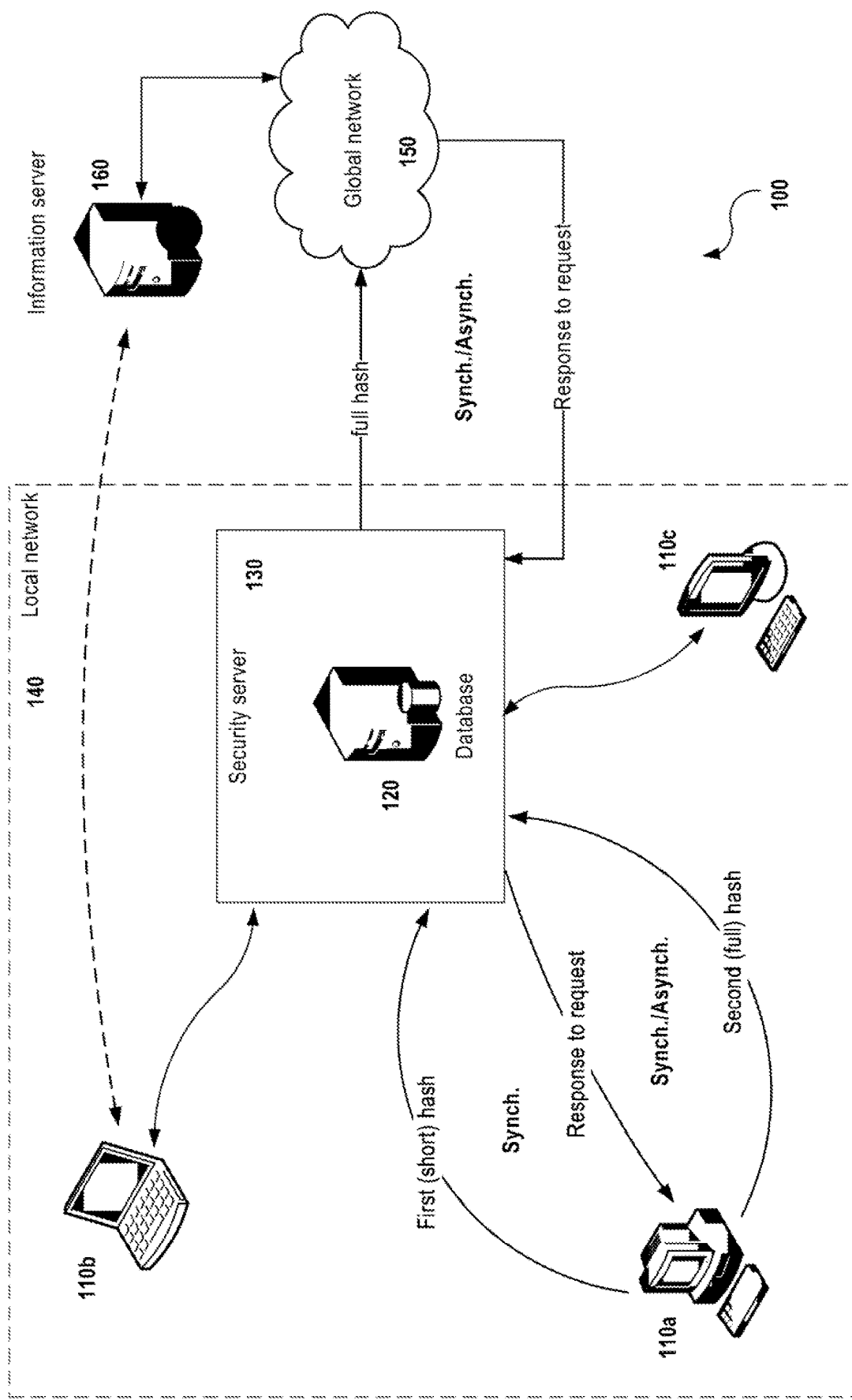
FIG. 1 is a block diagram illustrating an exemplary system for generating a request for information about a file being scanned in accordance with aspects of the present disclosure.

FIG. 1 is a block diagram illustrating a system 100 for generating a request for information about a file being scanned. In one aspect, the generating of the request for information about a file during the antivirus scan of the file is performed by a most suitable type of antivirus scan. In one aspect, the requested information about the file includes at least information about a harmfulness or a safety of the file being scanned. In one aspect, said information constitutes a marker indicating certain information. Such information, for example, may involve the kind of malicious file, the methods of curing the file, the hash value of the file, and so forth. Thus, the system 100 makes it possible to optimize the operations of the antivirus applications by reducing the time needed for the antivirus scanning of the file, prior to the execution of the file on a computer.

Figure 5:
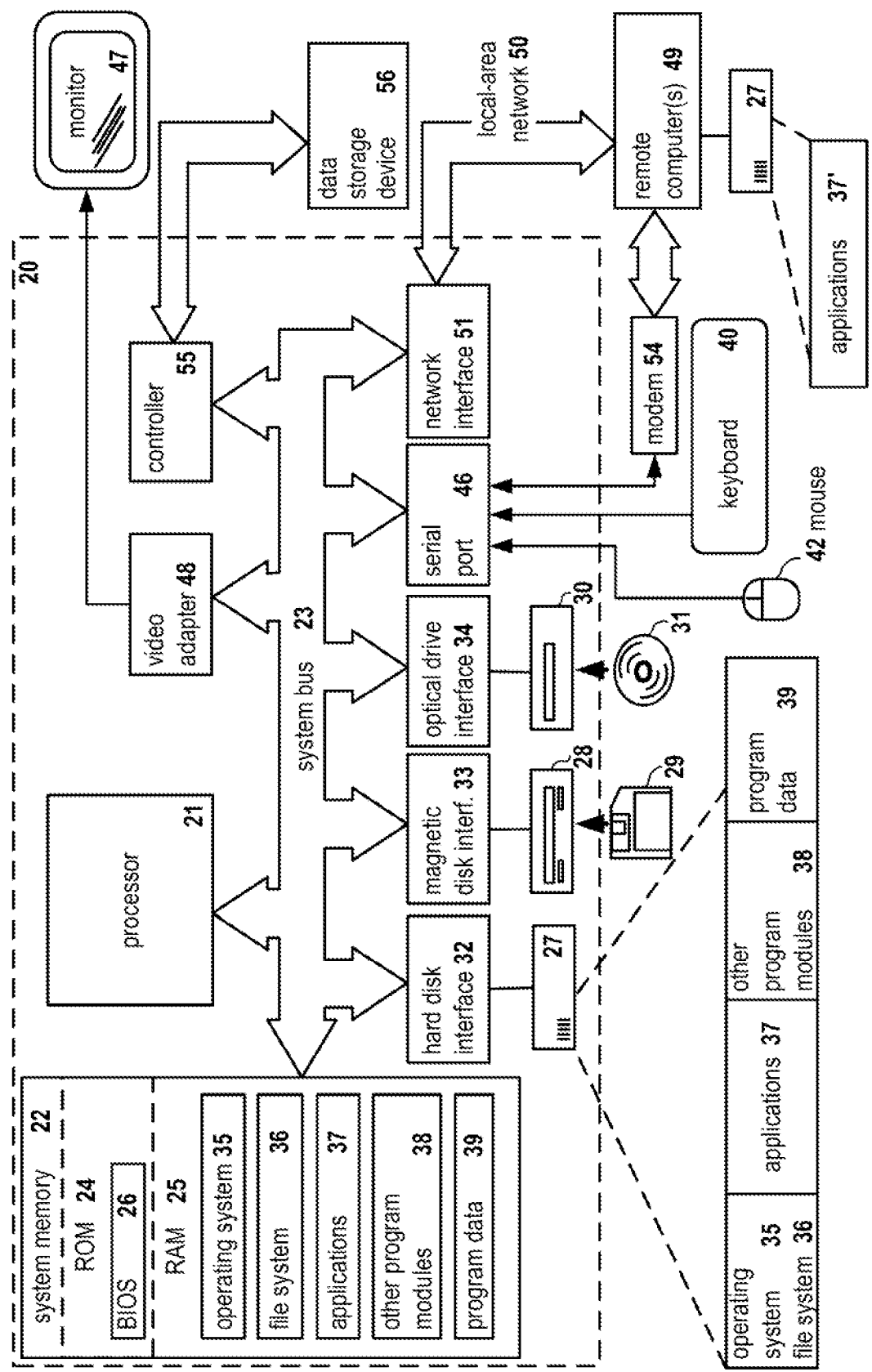
FIG. 5 presents an example of a general-purpose computer system on which aspects of the present disclosure can be implemented.

The system 100 includes at least one computer 110a. In the present disclosure, the modules of the system for generating a request for information on a file being scanned are understood as being actual devices, systems, components or groups of components realized with the use of hardware, such as application-specific integrated circuits (ASIC) or field-programmable gate arrays (FPGA) or, for example, in the form of a combination of software and hardware, such as a microprocessor system and a set of software instructions, as well as on neurosynaptic chips. The functionality of such modules of the system can be realized exclusively by hardware, and also in the form of a combination, where some of the functionality of the modules of the system is realized by software, and some by hardware. In some aspects, some of the modules or all of the modules may be executed on the processor of a general-purpose computer (such as is shown in FIG. 5).

The system components may be realized in the confines of a single computing device or distributed among several interconnected computing devices. The realization of the computer may be understood to mean both personal computers such as desktop computers, notebooks and netbooks, and electronic devices with wireless communications, such as mobile telephones, smartphones and tablets. In FIG. 1 the computers 110a, 110b and 110c are realized in the form of personal computers. It should be noted that, upon further mentioning of one of the computers, analogous operation may also occur on the other computers, except in cases where it is particularly indicated that a specific aspect is being discussed.

The computer 110a includes various programs, such as hardware, software, and/or system programs. In one aspect, the computer 110a contains at least an antivirus application (not shown). In the general case, the purpose of the antivirus application is to detect malicious files and counteract attacks on the data of users being kept on the computer 110a, for example via malicious files. The antivirus application and its components are realized in the form of programs, while this realization is in no way limited. One example of an antivirus application is the application Kaspersky Total Security from the firm AO Kaspersky Lab.

In one aspect, the antivirus application may be realized in the form of an antivirus agent, the distinguishing feature of which as compared to an antivirus application is its limited makeup of protection components; as a rule, the antivirus agent interacts with remote security systems, which have a more complete array of protection and analysis components. Thus, due to the antivirus agent, the workload for different elements of the computer, such as the data storage medium, the processor, the memory and others, is optimized.

Figure 2:
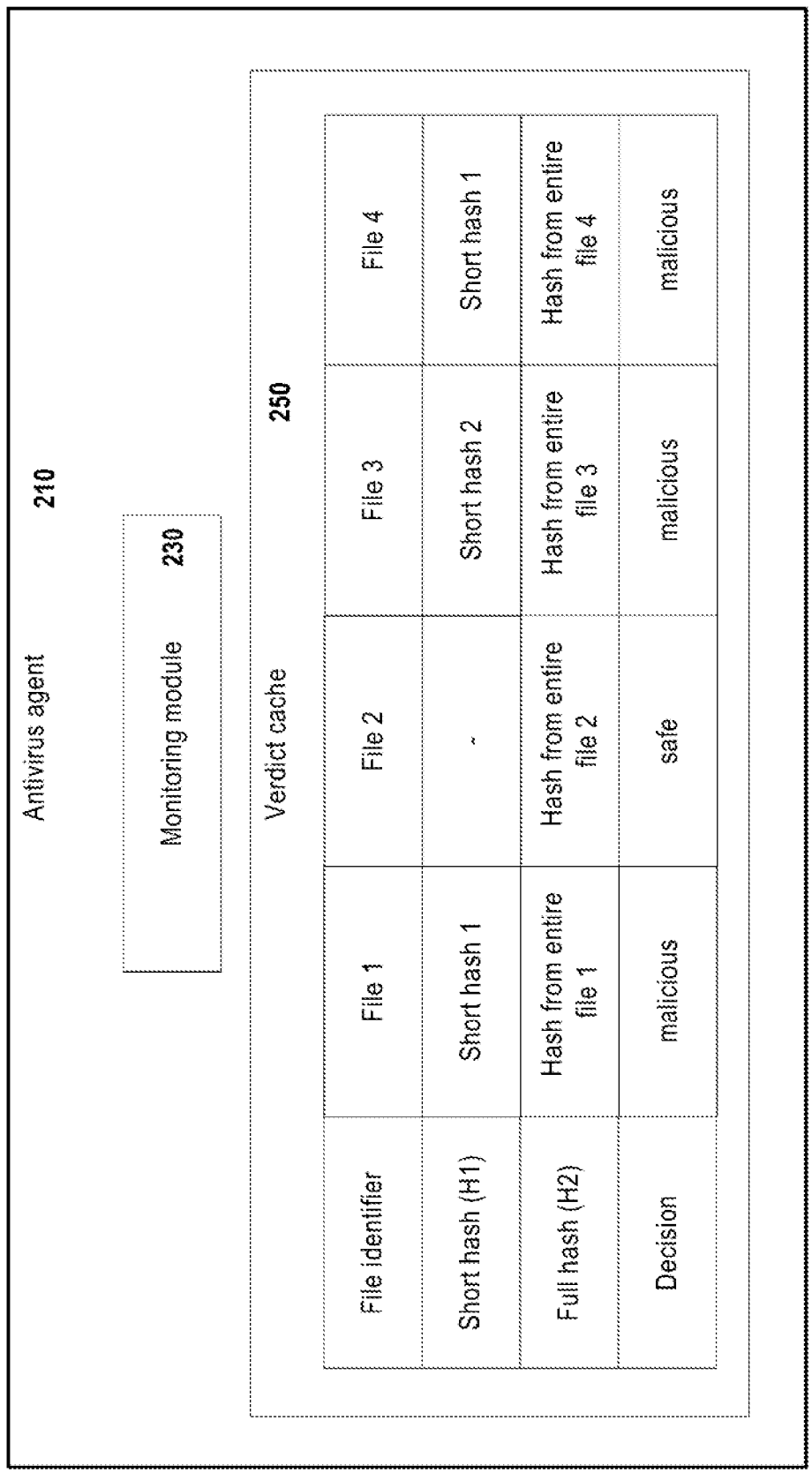
FIG. 2 is a block diagram illustrating an example of the make-up of an antivirus agent in accordance with aspects of the present disclosure.

FIG. 2 is a block diagram illustrating an example of the structure of an antivirus agent in accordance with aspects of the present disclosure. In one aspect, the antivirus agent 210 of FIG. 2 includes at least: a monitoring module 230 and a verdict cache 250. The monitoring module 230 is used for one or more of: tracking a launching and/or execution of a file, e.g., an execution of the file on the computer 110a, performing an interception and/or a halting of the launching of a file prior to antivirus scanning of the file, and halting the antivirus scanning, e.g., the antivirus scanning via itself, depending on the aspects of the agent 210. In the general case, the term "file" as used in the present disclosure refers to an executable file. The verdict cache 250 of the antivirus agent 210 is designed to store information needed by the antivirus agent to fulfill its purpose.

In one aspect, the information stored is information about malicious and safe objects, e.g., information as to malicious files or safe files. In one aspect, the information stored in the verdict cache is updated either with a certain frequency over the course of time or based on demand. In one aspect, the information in the verdict cache is stored and provided (for example, to the monitoring component 230). In one aspect, the information in the verdict cache is provided in a preferred form, e.g., in a form of hash values (hashes) of files. The information that is provided to the monitoring component enables the antivirus agent to accomplish its tasks. In one aspect, the hash values of files have two types: short hash and full hash.

It is noted that the verdict cache 250 does not contain information about the short hash values of safe files, but rather only information about full hashes. However, the antivirus agent 210 may also contain other components of the antivirus application. The presence of a given component will depend on the specific aspects of the antivirus agent. In other words, based on the aspects, the components and their tasks may vary. Examples of the tasks of the components of the antivirus agent are: antivirus scanning of files being kept on the computer of a client on demand (on demand scanning); antivirus scanning on access (on access scanning); protection against attacks from the network; behavioral detection; monitoring of system events; searching for system anomalies; analytical components; expert evaluation, and so on.

In one aspect, the antivirus agent 210 interacts with various other electronic devices, e.g., with other computers 110b and 110c and/or external servers, for example, a security server 130, an information server 160. The interaction of the computer 110a is done through various networks. Depending on the aspects of the present disclosure, the network may be a global network 150, such as the Internet, or a local network, such as the network 140. The network may also be characterized as a corporate network, a private network, and so on. Moreover, the link via these networks will be realized depending on the capabilities of the electronic devices themselves. Thus, for example, if the client computer is a wireless communication device (such as a smartphone), the link will occur through a wireless network. Examples of wireless networks are 3G networks, 4G networks, Wireless Fidelity (WiFi®), Bluetooth® and other networks. When the computer is a portable computer, the links may be realized either by wireless or by wireline networks (e.g., a connection based on Ethernet).

In one aspect, the antivirus agent 210 interacts with a security server 130 located in a local network 140, and/or with an information server 160, via a global network 150.

The security and information servers may be realized by an aspect of the computer system presented in FIG. 5. In one exemplary aspect, the security server 130 comprises a server on which the application "Kaspersky Security Center" is being used, wherein the security server 130 further contains a database 120. In another exemplary aspect, the information server 160 comprises a database used in an infrastructure of a Kaspersky Security Network (KSN). The KSN is a service providing access to the knowledge database of the company AO Kaspersky Lab as to the reputation of files, Internet resources, and software, as well as other information. Likewise, one or both servers (i.e., servers 130 and 160) may be any suitable hardware and/or application software, and/or system software, or a combination thereof. In the aspects illustrated in FIG. 1, the servers 130 and 160 are shown as single servers. However, in other aspects of the present disclosure, the functionality of the servers 130 and 160 may be implemented in a distributed manner with the aid of several servers.

In one aspect, a functionality of the antivirus agent 210 for performing the antivirus scan of a file on the computer 110a includes at least one of:

i) intercepting an opening of the file, for example during the launching of the file on the computer, and thus halting the execution of the executable file;

ii) performing a synchronous calculation of a first (short) hash value of the file on the computer;

iii) performing a synchronous search for a first hash value in the verdict cache containing hashes and decisions on at least known malicious files;

iv) depending on the result of the search, selecting a synchronous or an asynchronous type of generating a request for information about the file, followed by searching for information in accordance with the generated request, wherein: when the synchronous type is selected, the execution of the file remains halted, when the asynchronous type is selected, the launching of the file resumes, and the generating of the request includes a calculation of a second (full) hash value of the file;

v) performing a search for a decision (verdict) for the file according to the generated request in order to complete the antivirus scanning; and vi) making a decision regarding the scanned file as to the scanned file's harmfulness or safety.

In one aspect, the functionality of the antivirus agent 210 further includes: scanning for a presence or an absence of errors of the first and second kinds, wherein the presence or absence of errors is in regards to the decision made as to the harmfulness or safety of the scanned file. In one aspect, the scanning for the presence of errors is for determining errors related to wrong decision when defining the file as being safe.

The working of the antivirus agent 210 to perform the antivirus scan of a file on the client computer 110a with the possibility of reducing the delay time of the file shall be described in detail below.

For the purposes of the present description, it is assumed that a process from an executable file is being launched on a computer 110a. In this case, an antivirus agent 210, in order to perform the antivirus scan of that file, intercepts the file and thus halts the execution of the file. Depending on the aspect of the present disclosure, this task may be performed either with the aid of the antivirus agent 210 itself or with the aid of its built-in components, such as the monitoring module 230, as described above.

The antivirus agent 210 then performs the antivirus scanning of the intercepted file. Depending on the aspect of the present disclosure, the antivirus agent 210 either performs its own analysis of the scanned file for the presence of a malicious program code, uses a remote server for the analysis, such as the remote security server 130, or uses a combination of both, i.e., a combination of its own analysis and analysis by the remote server. In one aspect, the combination of the various analysis may be performed by dividing up the analysis into multiple stages. The antivirus agent 210, during the performance of the antivirus scan, likewise selects the optimal type of scan during the file analysis from the standpoint of its blocking, namely, in different steps of the analysis, the antivirus agent 210 performs the analysis and makes a selection between the synchronous and the asynchronous scan modes (thereby generating requests for information about the file). The synchronous scan mode indicates a delaying of the file for the time to perform the antivirus scan, i.e., the file is not executed. The asynchronous scan mode indicates a launching of the file for further execution, while the antivirus scan itself continues in parallel with the execution of the file. The choice of the corresponding scan type is made on the basis of the calculation of the hash values and the search for the hashes in a verdict cache 250, followed by a decision among the scan modes.

It should be noted that, regardless of the aspects of the present disclosure, the antivirus agent 210 contains a verdict cache 250. In one aspect, the verdict cache 250 is a database containing information about files in the form of hashes, the hashes having at least two types: a short hash of the file and a full hash of the file. In another aspect, the verdict cache may be part of another database. In yet another aspect, the verdict cache may further contain at least decisions as to the harmfulness/or safety of the files corresponding to the complete hashes. In another aspect, the verdict cache is a region of memory containing a list of hashes of files and decisions (verdicts) as to the respective files. In one aspect, the verdict cache is realized either locally or remotely (for example, residing on the security server 130 in the database 120). In a preferred but not mandatory aspect of the present disclosure, for the case of a remote realization, the interaction between the server and the user computer on which the antivirus agent 210 is installed occurs via a wireline communication and the server is in the same network as the user computer on which the antivirus agent 210 is installed.

In one aspect, the short hash of the file (also referred to as the first hash of the file) is computed only from a certain portion or portions of the file. The benefit of the short hash is the reduced time for its computation as compared to the hash of the entire file, and the larger the file size the more important this benefit is. In one aspect, the full hash of the file (also referred to as the second hash) is computed from the entire file. The benefit of the full hash is the minimal likelihood of a collision (i.e., the coinciding of the hash of two different files), making it possible to precisely determine with high probability the presence of a particular decision about the file in the database or verdict cache. In contrast, the short hash of the file may correspond to several files at the same time, and hence requires a refinement in further analysis in order to eliminate the possibility of a collision. In one aspect, the procedure for selecting (determining) the portion of the file used for calculating the short hash of the file is a procedure based on trial and error. In another aspect, the selection of the portion of the file may also be based on a predetermined algorithm. For example, the selection of the portion of the file may be based on the type of file, wherein, for each type of file, a portion of the file for creating the first hash is defined. In particular, different unique portions of files of a particular size may be selected for different file types. In another aspect, the procedure for selecting the portion of a file for hashing takes account of different data about the file (i.e., file metadata), making it possible to choose the most unique portion of the file for hashing (calculation of the first hash). Examples of metadata of files used for the selection include: size, type, name, data related to creation and editing, information about the author/owner, values of header fields (if provided by the file format), and other data.

In one aspect of the present disclosure, the antivirus agent 210, after intercepting the launching of the process of a file, performs a synchronous calculation of the first hash of the file on the computer and performs a synchronous search for the first hash in the verdict cache. In a preferred aspect, the verdict cache resides together with the antivirus agent on the same computer. Depending on the result obtained from the search, the antivirus agent 210 selects a mode of operation for use during a further analysis/evaluation of the file. In other words, a selection is made between synchronous and asynchronous modes of operation. In the event that the first hash value was found in the verdict cache, the analysis of the file continues in synchronous mode, during which a second request is generated for the file and sent to the verdict cache 250. The generating of the second request includes: a synchronous calculation of the second hash and sending of the calculated second hash to the verdict cache 250. A synchronous search is then performed in the verdict cache. In contrast, if the first hash was not found in the verdict cache, the asynchronous mode of operation is chosen for further scanning, during which the execution/launching of the process of the file being scanned is resumed and the second hash of the file is calculated and sent to the verdict cache. After obtaining a response from the verdict cache, the antivirus agent 210 pronounces a decision as to the harmfulness/malicious of the file on the basis of the received response.

In one aspect, if it was determined on the basis of the request sent to the verdict cache 250 for the first hash of the file that the file is assigned to the safe files, then the further calculation of the second hash and the request sent to the verdict cache 250 and/or to the remote database 120 will be done on the basis of the asynchronous mode of operation in order to rule out the possible pronouncing of a wrong decision, i.e., a false alarm of the antivirus agent 210 when pronouncing a verdict as to the file being safe.

It should be noted that upon finding the first hash in the verdict cache, the second hash will be sent to this same verdict cache. In the event that the first hash is not found, the second hash of the corresponding file will be forwarded to the remote server (the security server or information server) to rule out the mentioned false alarm, if the verdict cache contains only information about malicious files.

In another aspect, the verdict cache resides in the database 120 of a security server 130 in a local network 140. In this case, the antivirus agent performs interactions similar to the aspects described above, namely, the calculation of the first hash of the file and the sending of the first hash to the verdict cache will be done in synchronous mode, while the generating of the request for information about the file during which the second hash is calculated and then the sending of the second hash to the verdict cache will be done on the basis of the response received from the verdict cache regarding the first hash. Thus, if the first hash is not found in the verdict cache, or the first hash is found in the verdict cache but the file is assigned to the safe type of files or a group of safe files, then an asynchronous calculation of the second hash and a further asynchronous operation occur. For example, the further asynchronous operation may include the transmitting, searching and pronouncing of a decision on the file being scanned. If the first hash is found, the antivirus agent 210 will operate in synchronous mode. It should be noted that a group of safe files refers to at least two files in which the first hash is identical.

In yet another aspect of the present disclosure, the antivirus agent 210, after intercepting the file, performs a local antivirus scan of the file, for example, using a local database 250. In the event that the file is determined to be safe, the file is scanned for a false alarm of the pronounced decision. In order to scan the file for the false alarm, the antivirus agent 210 performs a synchronous calculation and searches for the first hash of the file in a local verdict cache, the local verdict cache containing the first hashes of files, but only malicious files. If the first hash is found in the local verdict cache, the antivirus agent 250, in synchronous mode, generates the second hash of the file and searches for the second hash in the local verdict cache. If the second hash of the file is not found in the local verdict cache, the antivirus agent 250 resumes the operations of the file and performs further scanning in asynchronous mode, where the further scanning includes sending a request for information about the file containing the second hash of the file to a remote server, such as the security server 130. After receiving a response from the remote server, the antivirus agent 250 pronounces another decision. If the obtained response confirms the first decision, the operations of the antivirus agent 250 with the file is finished. If the response contains information repudiating the pronounced decision, namely, that the file is malicious, then the operation/operations of the file is/are halted and actions involving the curing or removal of the file are carried out.

In another aspect, the antivirus agent 210 performs the scan for a false alarm after pronouncing a decision about the file, regardless of whether or not a calculation of the hash values was used previously. In this case, when the file has been determined to be malicious, the further calculation of the full hash of the file and the request made to the remote server 130 occur synchronously. Otherwise, when the file has been determined to be safe, the calculation of the full hash and the generating of the request to the remote server 130 occurs asynchronously. After obtaining the response, the antivirus agent 210 either finishes working with the file being scanned or makes a correction of the pronounced decision, depending on the obtained response.

Figure 3:
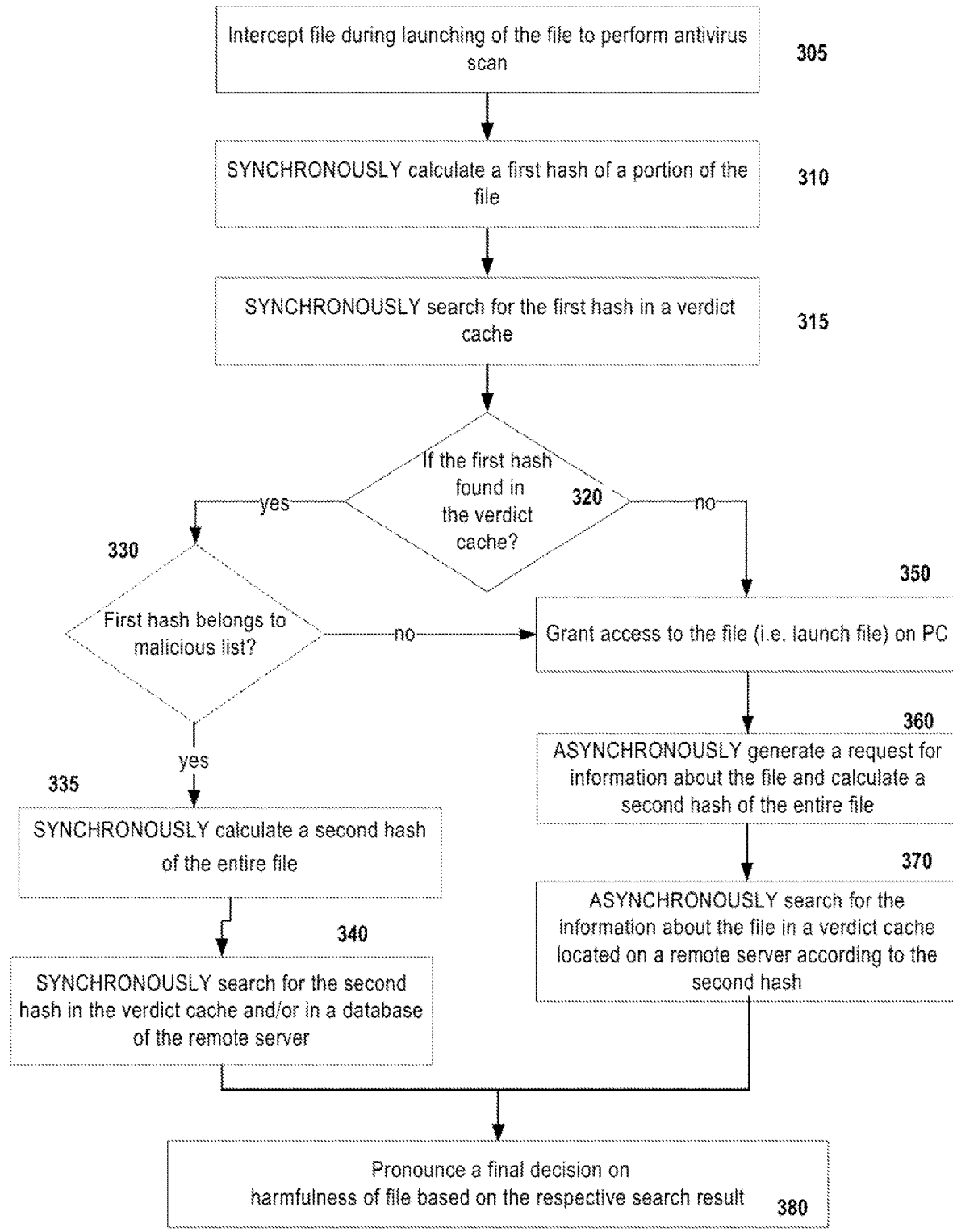
FIG. 3 is a flow diagram illustrating an exemplary method of generating a request for information about a file during an antivirus scan of a file.

FIG. 3 is a flow diagram illustrating an exemplary method of generating a request for information about a file during an antivirus scan of the file, in accordance with aspects of the present disclosure. The method of FIG. 3 may be carried out with the aid of the system described in FIG. 1.

In step 305, the method intercepts the file during the launching of the file (executable file) on the computer of the user (for example, such as the computer 110*a* in FIG. 1), the file being intercepted in order to carry out an antivirus scan. When the file is intercepted, the launching of a process being created from the file is blocked. A further execution of the file resumes upon completion of the antivirus scan or after obtaining a corresponding instruction for the launching of the file from the antivirus system. In step 310, the method synchronously calculates a first hash of a portion of the file. In a preferred aspect, the mechanism for calculating the first hash is realized on the basis of the present state of the art. For example, in one aspect, the mechanism for the calculation of the first hash is generated, wherein the generated mechanism contains criteria for a selection of a most preferable portion of the file for use during the generating (calculation) of the first hash. Examples of the criteria for the selection are based on analysis of data such as, the file type, the file size and other metadata. Thus, for the calculation of the first hash the choice of the portion of the file is based on an analysis of the metadata of the file with the aid of criteria—thereby allowing the most preferable (unique) portion of the file to be determined.

In step 315, after generating the first hash, the method synchronously searches for the first hash in a verdict cache. In one aspect, the verdict cache is part of the local database, the database containing, in addition to the verdict cache, decisions on both malicious files and trusted files. The verdict cache contains at least information about the short hash (the first hash) and the full hash (the second hash) of the files.

In step 320, the method determines whether or not the first hash has been found in the verdict cache. If the first hash is found in the verdict cache, the method proceeds to step 330, otherwise, the method proceeds to step 350. In step 330, the method determines whether the first hash belongs to list of malicious files. If so, the method proceeds to step 335, in which a synchronous calculation of the second hash of the file is done. It should be noted that the calculation of the second hash of the file is done from the entire file. Then, in step 340, after the second hash has been generated in step 335, a synchronous search is done for the second hash in the verdict cache and, if need be, in the database 120 of the remote security server 130. In step 380, the method pronounces a final decision as to the harmfulness of the file, the final decision being made according to the results of the search for the second hash.

In step 350, the antivirus agent grants access to the file, i.e., allows the launching of the process of the file on the computer. Then, in step 360, the method asynchronously generates a request for information about the file, and calculates a second hash of the file. In step 370, the method performs an asynchronous search for the information about the file in a verdict cache located on a remote server, e.g., a database 250 of the security server 130, according to the second hash of the file. In step 380, the method pronounces a final decision on the harmfulness or safety of the file based on the search results.

In one aspect of the present disclosure, step 330 may be omitted. In this case, the verdict cache will contain either only information about malicious files, or the first hash values only for malicious files. Therefore, the finding of the first hash in the verdict cache indicates that the file may belong to the malicious files, and consequently the method proceeds from step 320 to step 335.

Figure 4:
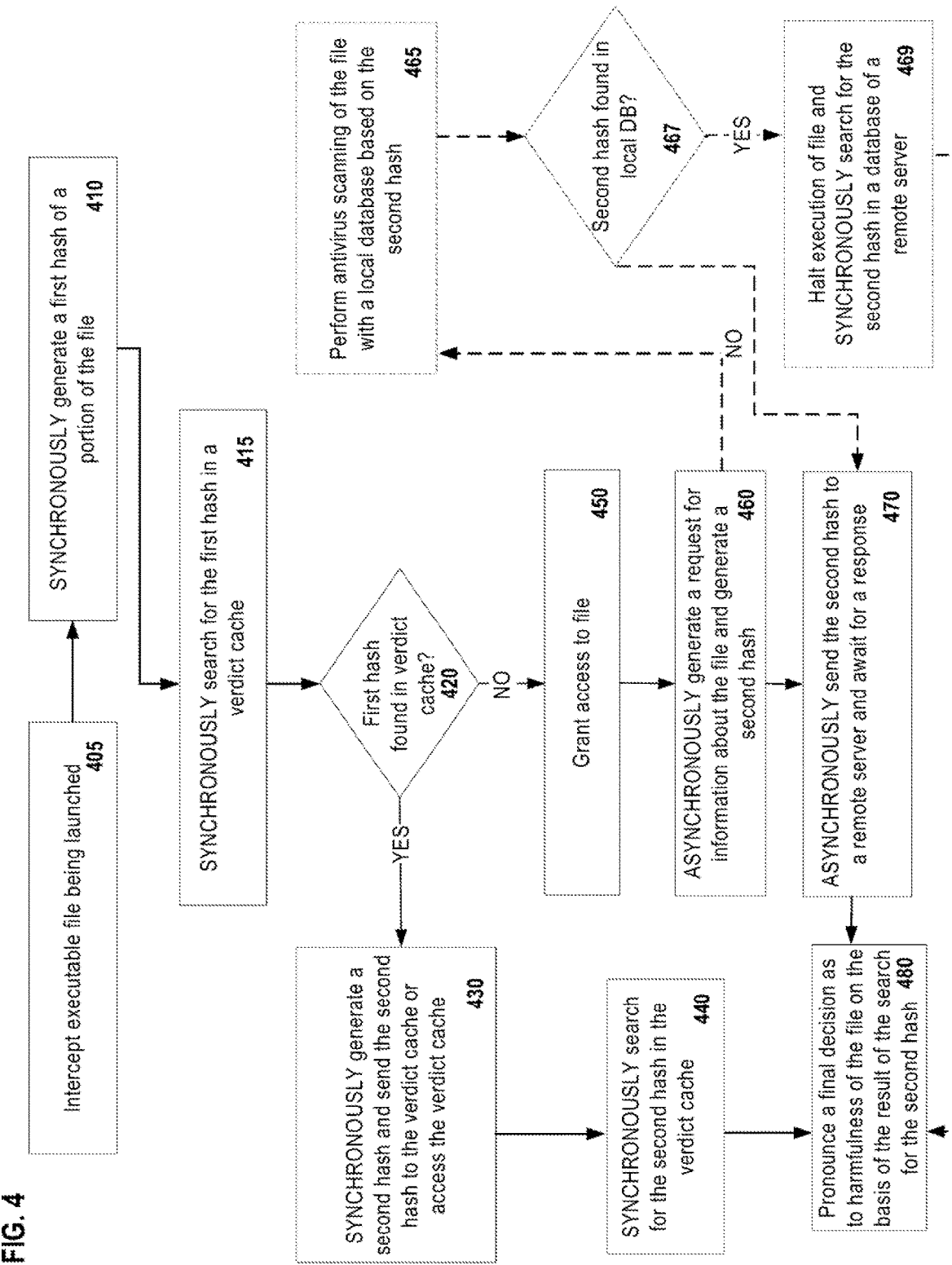
FIG. 4 is a flow diagram illustrating an exemplary method of generating a request for information about a file in order to verify that no false response is present.

FIG. 4 is a flow diagram illustrating an exemplary method of generating a request for information about a file in order to verify that no false response is present. The method of FIG. 4 may be realized with the aid of the system described in FIG. 1.

In step 405, the executable file being launched on the client computer 110*a* is intercepted with the aid of the antivirus agent. Next, the antivirus agent performs a scan of the file for the presence of malicious code. In order to perform the scanning of the file, in step 410, the method generates the first hash of a portion of the file, using the synchronous type of scan. It is noted that aspects for generating of the first hash were described above in relation to FIG. 1. In step 415, the method of the antivirus agent synchronously searches for the generated first hash of the file in the verdict cache, wherein the verdict cache contains information only about files containing malicious code, i.e., malicious files. In step 420, the method determines whether the generated first hash of the file is found in the verdict cache. If the first hash is found, the method of the antivirus agent 210 proceeds to step 430. Otherwise, the first hash is not found, and the method proceeds to step 450.

In step 430, the method synchronously generates the second hash of the file from the entire file and sends the second hash to the verdict cache or accesses the verdict cache. In step 440, the method synchronously searches for the second hash in the verdict cache. Then, in step 480, the antivirus agent pronounces a final decision as to the harmfulness of the file on the basis of the result of the search for the second hash. Thus, if the second hash was found in the verdict cache, the file is determined to be malicious. When the file is determined as being malicious, the file may be removed, or cured, or the user may be asked what to do with the file. If the second hash is not found in the verdict cache, the file is determined to be safe. Then, the method grants access to the file.

In step 450, the method grants access is to the file for execution of the file on the computer. Then, the antivirus agent, in step 460, asynchronously generates a request for information about the file, the request being generated for sending to the remote server for further analysis. In addition, in step 460, during the generating of the request, the method also calculates the second hash for the entire file.

In one aspect, in step 465, the antivirus agent, before sending the request to the server (as shown in step 470), performs an antivirus scanning of the file with a local database based on the second hash (if such is present in the antivirus agent), the local database containing information about malicious and safe files. In step 467, the method determines whether the second hash is found in the local database. In step 470, in the event of no decision being present in the local database, the request is sent to the remote server. In other words, if the second hash is not found in the local database, the request generated in step 460 is sent to the remote server. If a decision is found in the local database, the antivirus agent makes one of the following decisions:

if the local database is able to determine the second hash as being the hash of a malicious file, the antivirus agent proceeds to step 469. In step 469, the method halts the execution of the file and sends a request to the remote server to rule out a false alarm in the pronouncing of the decision, after which the synchronous scanning is used; and if the local database is able to determine the second hash as being the hash of a safe file, the antivirus agent finishes its work with the file and proceeds to step 470. Then, in step 470, the method asynchronously sends the request to the remote server, and waits for a response from the remote server as to the results of the search/analysis for the second hash of the file. In step 480, after obtaining a response to the request, the method uses the results of the search to pronounce a final decision as to the harmfulness of the file.

It should be noted that, in one aspect, after determining the file as being safe, in step 480, a scan for a false alarm in the pronouncing of this decision may be performed asynchronously. It is most critical to perform such a scan when the first hash of the file was found in the indicated verdict cache but not yet for the second hash of the file. The scan for a false alarm includes: the antivirus agent making a request to the remote server, with the request containing the second hash. After receiving a reply, the antivirus agent makes a final decision as to the file on the basis of the information contained in the reply: it either upholds the previous decision, or alters the previous decision with the resulting consequences thereof (for example, it blocks the file). In another aspect, a scan for a false alarm may be performed when the file is determined to be malicious. In this case, the scanning continues to be the synchronous type, i.e., the file will be blocked at least until this scan is finished.

Depending on the aspect, the decision includes either finding the file as being malicious or safe or eliminating a previously made wrong decision.

FIG. 5 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between modules of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

In one exemplary aspect, the hard disk 27, the removable magnetic disk 29 and the removable optical disk 31 may be connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned modules in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for granting access to a file, the method comprising:
   calculating a first hash of a portion of the file;
   searching for the first hash in a local database that contains a verdict cache containing hashes of known malicious files and trusted files;
   when the first hash is found in the verdict cache and the first hash indicates that the file is malicious, calculating a second hash of the file synchronously, searching for the second hash in the verdict cache and a remote server synchronously, and pronouncing a final decision as to a harmfulness or safety of the file based on the results of the search; and
   when either the first hash is not found in the verdict cache or the first hash is found in the verdict cache and indicates that the file is a trusted file, granting access to the file, calculating the second hash of the file based on all portions of the file, generating a request for information about the file including at least an indication as to harmfulness of the file, sending the request to a remote server to search for the second hash in a verdict cache of the remote server, and pronouncing a decision as to harmfulness or safety of the file based on results of the search received from the remote server in response to the request.

2. The method of claim 1, wherein the portion of the file used for calculating the first hash is selected based on a predetermined criteria, the predetermined criteria being based at least on one of: a type of the file, a size of the file, and metadata of the file.

3. The method of claim 1, further comprising:
   performing an antivirus scanning of the file based on the second hash with the local database.

4. The method of claim 3, further comprising:
   when the second hash is found in the local database, halting execution of the file and synchronously search for the second hash in a database of the remote server.

5. The method of claim 1, further comprising:
   determining errors of a first kind and second kind in verdicts based on comparisons of first hashes and verdict cache in the local database.

6. The method of claim 1, wherein the local database is located on a same computing device performing the granting of access to the file.

7. The method of claim 1,
   wherein the calculating of the first hash of the portion of the file is performed synchronously,
   the searching for the first hash in the local database that contains the verdict cache is performed synchronously,
   when either the first hash is not found in the verdict cache or the first hash is found in the verdict cache and indicates that the file is a trusted file, the calculating of the second hash of the file, the generating a request for information about the file including at least an indication as to harmfulness of the file, and the sending the request to a remote server to search for the second hash in a verdict cache of the remote server are performed asynchronously.

8. A system for granting access to a file, comprising:
   at least one processor configured to:
      calculate a first hash of a portion of the file;
      search for the first hash in a local database that contains a verdict cache containing hashes of known malicious files and trusted files;
      when the first hash is found in the verdict cache and the first hash indicates that the file is malicious, calculate a second hash of the file synchronously, search for the second hash in the verdict cache and a remote server synchronously, and pronounce a final decision as to a harmfulness or safety of the file based on the results of the search; and
      when either the first hash is not found in the verdict cache or the first hash is found in the verdict cache and indicates that the file is a trusted file, grant access to the file, calculate the second hash of the file based on all portions of the file, generate a request for information about the file including at least an indication as to harmfulness of the file, send the request to a remote server to search for the second hash in a verdict cache of the remote server, and pronounce a decision as to harmfulness or safety of the file based on results of the search received from the remote server in response to the request.

9. The system of claim 8, wherein the portion of the file used for calculating the first hash is selected based on a predetermined criteria, the predetermined criteria being based at least on one of: a type of the file, a size of the file, and metadata of the file.

10. The system of claim 8, the processor further configured to:
    perform an antivirus scanning of the file based on the second hash with the local database.

11. The system of claim 10, the processor further configured to:
    when the second hash is found in the local database, halt execution of the file and synchronously search for the second hash in a database of the remote server.

12. The system of claim 8, further comprising:
    determining errors of a first kind and second kind in verdicts based on comparisons of first hashes and verdict cache in the local database.

13. The system of claim 8, wherein the local database is located on a same computing device performing the granting of access to the file.

14. The system of claim 8,
    wherein the calculating of the first hash of the portion of the file is performed synchronously, the searching for the first hash in the local database that contains the verdict cache is performed synchronously, when either the first hash is not found in the verdict cache or the first hash is found in the verdict cache and indicates that the file is a trusted file, the calculating of the second hash of the file, the generating a request for information about the file including at least an indication as to harmfulness of the file, and the sending the request to a remote server to search for the second hash in a verdict cache of the remote server are performed asynchronously.

15. A non-transitory computer readable medium storing thereon computer executable instructions, that when executed by a hardware processor, perform a method for granting access to a file, including instructions for:

calculating a first hash of a portion of the file;

searching for the first hash in a local database that contains a verdict cache containing hashes of known malicious files and trusted files;

when the first hash is found in the verdict cache and the first hash indicates that the file is malicious, calculating a second hash of the file synchronously, searching for the second hash in the verdict cache and a remote server synchronously, and pronouncing a final decision as to a harmfulness or safety of the file based on the results of the search; and when either the first hash is not found in the verdict cache or the first hash is found in the verdict cache and indicates that the file is a trusted file, granting access to the file, calculating the second hash of the file based on all portions of the file, generating a request for information about the file including at least an indication as to harmfulness of the file, sending the request to a remote server to search for the second hash in a verdict cache of the remote server, and pronouncing a decision as to harmfulness or safety of the file based on results of the search received from the remote server in response to the request.

16. The non-transitory computer readable medium of claim 15, the instructions further including instructions for:

performing an antivirus scanning of the file based on the second hash with the local database.

17. The non-transitory computer readable medium of claim 16, the instructions further including instructions for:

when the second hash is found in the local database, halting execution of the file and synchronously search for the second hash in a database of the remote server.

18. The non-transitory computer readable medium of claim 15, the instructions further including instructions for:

determining errors of a first kind and second kind in verdicts based on comparisons of first hashes and verdict cache in the local database.

19. The non-transitory computer readable medium of claim 15, wherein the local database is located on a same computing device performing the granting of access to the file.

20. The non-transitory computer readable medium of claim 15, wherein the calculating of the first hash of the portion of the file is performed synchronously, the searching for the first hash in the local database that contains the verdict cache is performed synchronously, when either the first hash is not found in the verdict cache or the first hash is found in the verdict cache and indicates that the file is a trusted file, the calculating of the second hash of the file, the generating a request for information about the file including at least an indication as to harmfulness of the file, and the sending the request to a remote server to search for the second hash in a verdict cache of the remote server are performed asynchronously.

\* \* \* \* \*